Sept. 2, 1941.   C. I. MacNEIL   2,254,970
ENGINE SYNCHRONIZATION
Filed Sept. 20, 1940   2 Sheets-Sheet 1

INVENTOR.
Charles I. Mac Neil
BY Martin J. Finnegan
ATTORNEY

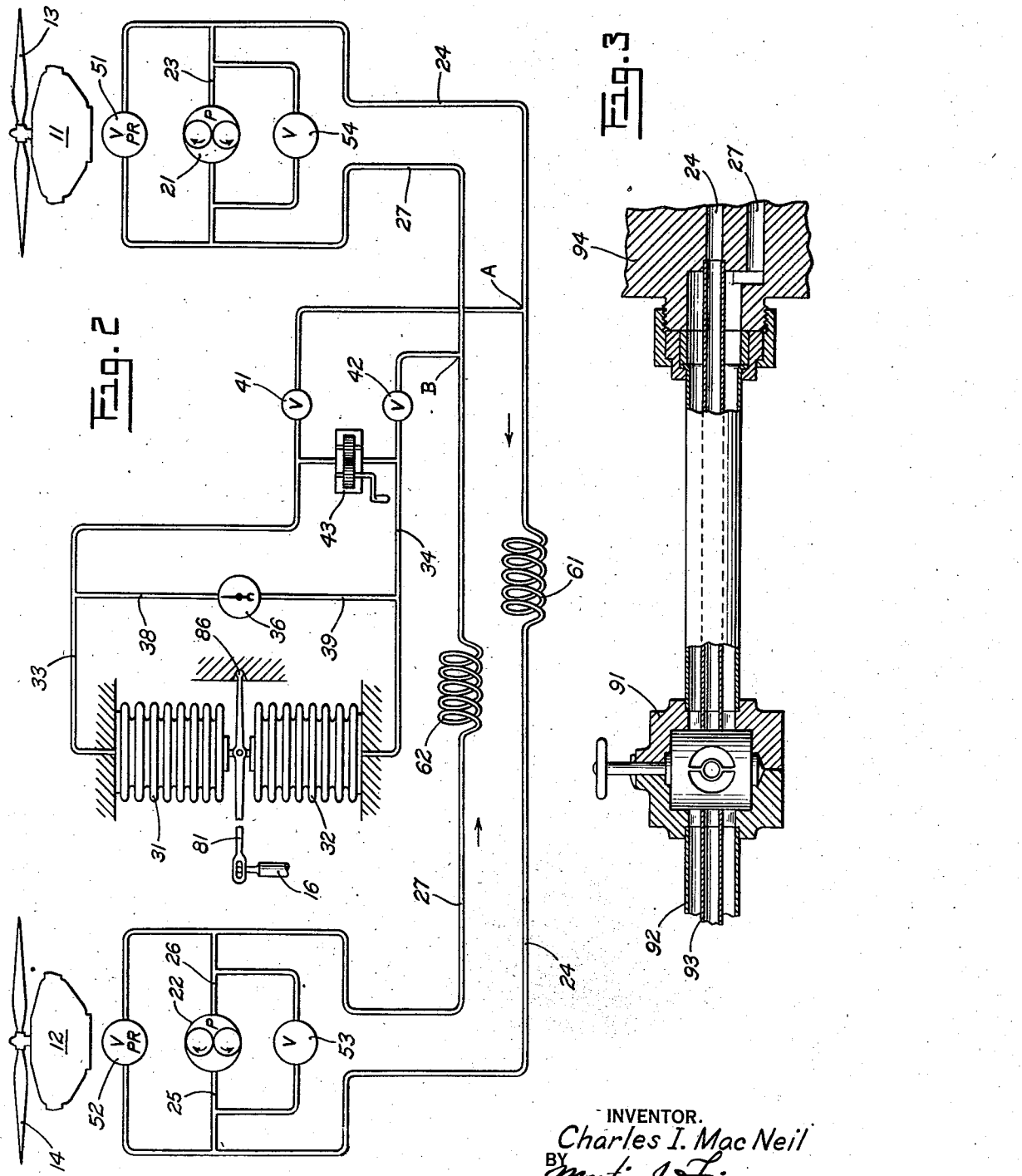

Patented Sept. 2, 1941

2,254,970

UNITED STATES PATENT OFFICE 2,254,970

ENGINE SYNCHRONIZATION

Charles I. MacNeil, Glen Ridge, N. J., assignor to Bendix Aviation Corporation, South Bend, Ind., a corporation of Delaware Application September 20, 1940, Serial No. 357,642

6 Claims. (Cl. 60—97)

This invention relates to synchronization and particularly to the synchronization of two or more independently energized prime movers such as the several engines of an aircraft.

When aircraft propellers turn at non-synchronous speeds there develops an objectionable amount of noise and vibration, as well as a loss in aerodynamic efficiency. Devices for synchronizing aircraft engines have been patented, but most aircraft installations still fail to include any such device, a fact that indicates that there is a lack of a completely satisfactory synchronizer available for commercial use. This may also be due to the complexity and consequent expensiveness of devices heretofore known.

Most of the prior synchronizers involve use of heavy gearing, electrical apparatus, or mechanism that must be constantly checked and precisely adjusted to maintain accuracy. An object of the present invention is to provide a synchronizing apparatus that will perform accurately, will not require frequent adjustment, and will not involve heavy gearing or electrical energy for its operation.

Another object of the invention is to provide a synchronizer that is operable by utilization of a relatively small amount of hydraulic power, and with the use of small and inexpensive, yet highly efficient and dependable hydraulic mechanism.

Another object is to provide a hydraulic synchronizing mechanism including a hydraulically operated indicater ("Synchroscope") and alternative manual control means for manual synchronization whenever desired.

A further object is to provide a hydraulic synchronizer that is self-contained, yet readily applicable to other hydraulic mechanism, (such as a hydraulically operated propeller pitch control of the type shown in Woodward Patent No. 2,204,640 of June 18, 1940) where such hydraulic mechanism constitutes a speed controlling agency for the engine or engines to be synchronized. The invention, however, is applicable to any type of speed controlling agency, whether such agency acts to vary the propeller pitch, fuel supply, or other speed controlling factor of the engine.

Other objects and features of the invention will become apparent upon examination of the following specification and the accompanying drawings wherein the preferred embodiment of the invention is illustrated. It is to be understood, however, that the drawings are merely illustrative and that the scope of the invention extends to other embodiments which fall within any of the several definitions of the invention set forth in the appended claims.

Fig. 2 is a second schematic representation of the system in Fig. 1 including certain parts of the system which do not appear in Fig. 1; and Fig. 3 is a view in elevation, with certain parts shown in mechanical section, of the preferred structural arrangement of the piping and associated flow control means for the system shown in Figs. 1 and 2.

Figure 1:
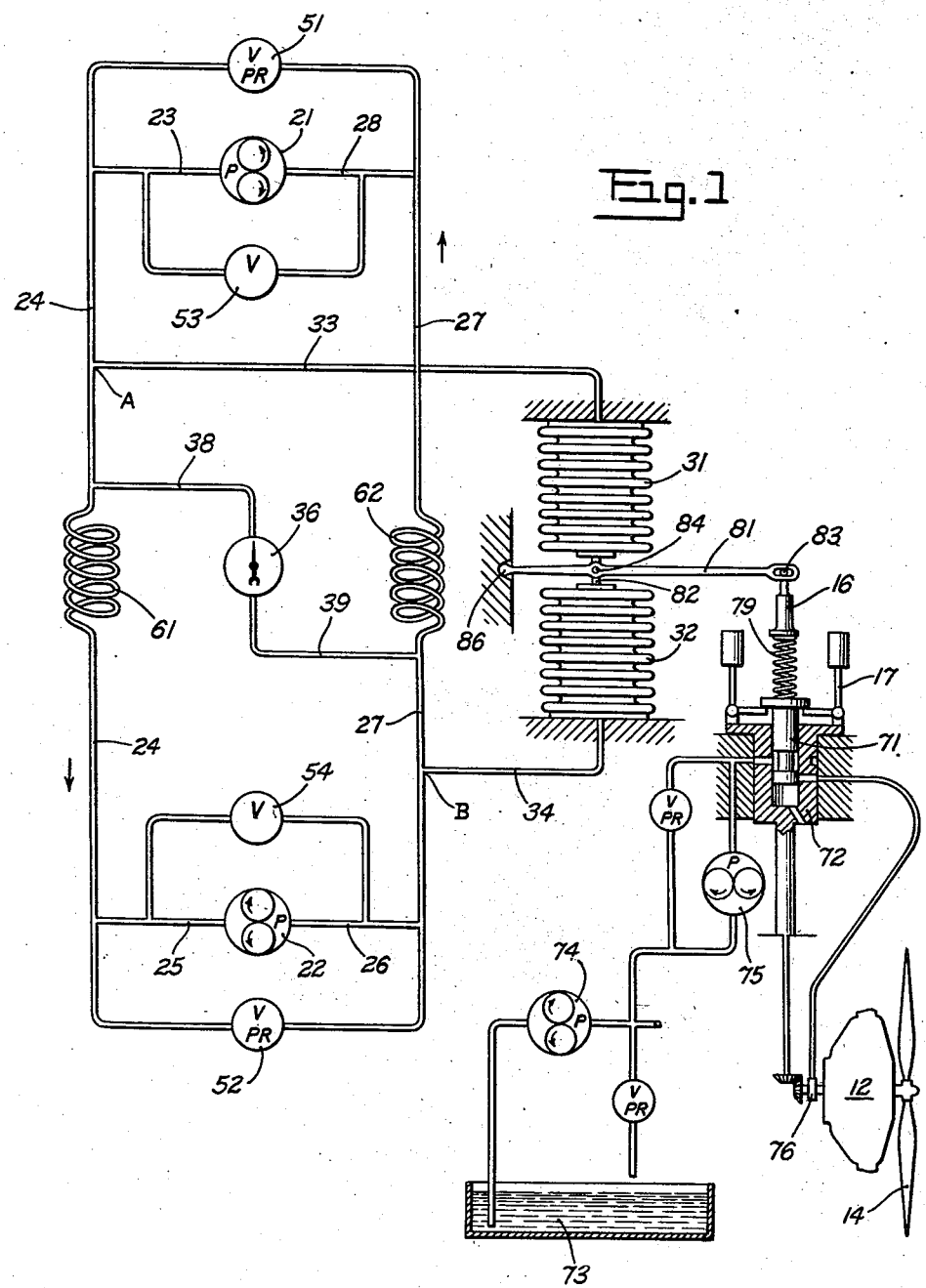
Fig. 1 is a schematic representation of a synchronizing system embodying the invention.

Referring principally to Figs. 1 and 2, reference characters 11 and 12 designate a pair of internal combustion engines which may be assumed to be mounted on opposite sides of the center lines of an aircraft, and adapted to have their speeds controlled in any of the usual ways, such as by variation of their throttle settings, to vary the amount of fuel supplied thereto, or by variation of the pitch angle of the blades of the propellers (shown at 13 and 14 for the respective engines 11 and 12.) One form of propeller pitch mechanism is indicated schematically in Fig. 1, and for purposes of illustration the invention is shown as applied to the spring loading member 16 of the governor 17 of such a pitch varying mechanism, wherefore the synchronizing mechanism to be described operates through such spring loading member 16 to control the pitch of the propeller blades 14 thereby controlling the speed of the engine 12 by causing it to synchronize at all times with the speed of the "master" engine 11; but it is to be understood that the invention is equally applicable to any other suitable form of speed varying mechanism employable to effect such synchronization.

The system of the invention includes a pump 21 adapted to be driven by suitable connections, not shown, operated by the engine 11, a similar pump 22 adapted to be similarly driven by the engine 12, a system of conduits including pipes 23, 24, 25, 26, 27 and 28 forming a complete circuit to and from the pumps 21 and 22 (the conduit 23 being assumed to be the outlet or pressure side of the pump 21, and conduit 26 the outlet or pressure side of pump 22); a pair of expansible elements 31 and 32 having fluid conducting communication with the pipes 24 and 27, respectively, as indicated at 33 and 34, a visual indicator 36 which may be of the differential pressure operated type and for which purpose it will have fluid conducting communication with the pipes 24 and 27, respectively, as indicated at 38 and 39; a pair of shut-off valves 41 and 42, and a manually operable reversible pump 43 by which synchronism between the engines 11 and 12 may be maintained manually (and observed on the indicator 36) whenever for any reason it is necessary or desirable to discontinue operation of the automatic circuit which includes the pumps 21 and 22. Additional desirable parts include a pair of pressure relief valves 51 and 52 forming by-passes around the pumps 21 and 22, respectively, in the event of development of excessive pressures, and a pair of adjustable leakage valves 53 and 54 to allow compensation for any difference in the volumetric efficiency of the pumps 21 and 22, the compensation being effected by changing the setting of one of the valves sufficiently to allow leakage around the associated pump, equivalent to that which occurs by reason of a lower efficiency in the operation of the other pump. Another desirable addition to the system is the pair of coiled sections 61 and 62 in the pipes 24 and 27, respectively, by which there is provided opportunity for sufficient dissipation of heat generated in the system to maintain a normal temperature therein at all times.

While the governor form of speed control that is illustrated in Fig. 1 is not per se, a part of the present invention—and is more fully described in U. S. Patent No. 2,204,640 granted to Woodward—it may be helpful to point out herein that such a mechanism includes, as essential parts thereof, a slide valve 71 adapted to reciprocate in a valve housing 72 having ports therein to establish, when the speed conditions warrant, a circuit for the flow of fluid from a suitable source 73, and pumps 74 and 75 to a valve mechanism and servo-motor 76 adapted to exert pressure to turn the blades of the propeller 14 against the opposing torque of centrifugal weights, as in the well-known type of hydraulic pitch varying mechanism referred to in said patent to Woodward and also in various patents issued to Frank W. Caldwell, among which may be noted Patent No. 2,163,663. It will be understood that the effect of the valve 71 in controlling the operation of such pitch varying mechanism is governed by the loading of the spring 79 of the governor, as the said loading varies the effect of speed upon the amount of movement of the valve 71. Accordingly, any mechanism which varies this spring loading in response to a deviation in the speed of the subordinate engine 12, with respect to the master engine 11, will be effective (through the corresponding shift in the position of valve 71) to produce a corresponding change in the angles of the blades of the propeller 14, and thereby to restore the speed of the engine 12 to synchronism with that of engine 11.

It will be apparent that if motion occurs at the free ends of the expansible bellows 31 and 32—the ends thereof which receive the conduits 33 and 34, respectively, being held stationary as indicated—such motion can be communicated to the spring loading member 16 of the governor mechanism by interposing, between said bellows and said member 16, a suitable linkage such, for example, as that indicated at 81, 82 and 83; the member 81 being a link pivotally connected to the member 82 by a suitable pin 84, and having a ball and socket fulcrum 86 which causes the said lever 81 to swing about said ball and socket connection 86 in response to movement of either bellows 31 and 32, and the corresponding reciprocal movement of the connecting rod 82 which links the free ends of the bellows 31 and 32 and therefore partakes of any movement of either of said elements. Such a swinging of the lever 81 will produce a corresponding linear motion of the member 16 by reason of the pin and slot connection indicated at 83, and there will be a corresponding variation in the loading of the spring 79. Such variation will allow the governor weights to act, through valve 71, to restore synchronism as heretofore explained.

It will further be understood that any deviation in the speed of the engine 12 from that of the master engine 11 will result in a corresponding speed deviation as between the pumps 22 and 21 driven by the respective engines, and this difference in the pump speeds will be reflected in a difference in the pumping output, and hence in the pressure at points A and B—the point B reflecting the pressure at the output of the pump 22, and point A reflecting the pressure at the output of the pump 21. Any pressure difference at these two points will, of course, result in movement of the bellows actuated rod 82, due to the uneven expansion of the two bellows 31 and 32 by reason of the difference in the pressures therein. Likewise any such pressure differences will be reflected in the differential pressure gauge 36, so that the operator of the craft will be constantly informed, by this visual means, as to the synchronism or non-synchronism of the two engines. It will further be apparent that as the governor mechanism responds to such movement of linkage 82, 81 and 83, the resulting change in the speed of engine 12 toward that of the master engine 11, will produce a corresponding diminution in the degree of pressure difference at the points A and B, due to the resulting change in speed of the pump 22 toward synchronism with pump 21.

As heretofore indicated, the invention preferably includes shut-off valves 41, 42 (Fig. 2) by which the main circuit, including the pumps 21 and 22, may be completely cut off from the bellows 31 and 32; but the bellows may nevertheless be operated by manipulation of the hand pump 43. On any such occasion a manual actuation of the pump 43 will operate to shift the desired amount of fluid from the bellows 31 to the bellows 32 (or vice versa, according to the direction of rotation of the pump) and in this manner the linkage 82, 81 and 83 will be brought into operation to restore synchronism by the same process as that which occurs during the functioning of the automatic controls including the pumps 21 and 22.

If desired, the valves 41, 42 may be mechanically interlinked so that a single manual operation may be effective to close off both valves simultaneously; or this may be done by resorting to the mechanism shown in Fig. 3 wherein a single valve 91 cooperates with a pair of coaxially disposed conduits 92 and 93 to provide a unitary control of flow therethrough. These coaxially disposed pipes 92 and 93 may be inserted in the system at some point along the pipes 24 and 27, the connection between the coaxial pipes and the parallel pipes being effected by utilizing a fluid chamber, as indicated at 94, through which the pipe 24, for example, may pass to become the inner pipe of the coaxial group, while the other pipe 27 is caused to terminate in said chamber as would also the outer pipe 92 of the coaxial group. With the arrangement as shown it will be seen that a ninety-degree rotation of the rotor of valve 91 may operate to simultaneously establish or disestablish communication between the right and left hand sections of the coaxial pipes 92 and 93; and by providing at the opposite end a chamber similar to the chamber 94, the said coaxial pipes will, of course, operate to feed fluid back to the system shown in Fig. 1 and Fig. 2 without any other change in the system. It will further be understood that such coaxial pipes may be used at any other point in the system where parallel pipes are employed, and where so used will have the advantage of reducing the total space occupied by the pipes, as well as affording additional protection against any injury to the pipes—whether from ordinary causes or from extraordinary causes, such as contact with a bullet or projectile fragment aimed at the aircraft on which the system is installed.

While the invention has been described as applied to a pair of engines, of which one is the master and the other the subordinate or controlled engine, it is to be understood that the invention is applicable to a system including more than two engines, in which case the speed of the master engine may be maintained for each of the subordinate engines by adding to the system additional pumping mechanism corresponding to the pump 22 and associated parts of the engine 12, additional bellows corresponding to the bellows 31 and 32, and speed varying mechanism to be shifted by said bellows when necessary to restore synchronism as to such additional engines.

What is claimed is:

1. In combination with a pair of engines, at least one having speed regulating means associated therewith, a pair of fluid pumps rotatable with said engines, one at a speed corresponding to one engine, the other at a speed corresponding to the other engine, means responsive to a difference in the pressures developed by said pumps to change the setting of said speed regulating means, said last-named means comprising fluid conduits connecting the inlet of each pump with the outlet of the other, fluid receiving means in communication with one of said conduits, additional fluid receiving means in communication with the other of said conduits, a mechanical linkage connecting said fluid receiving means with said speed regulating means, said linkage being held against movement by the equal and opposing pressures of said fluid receiving means, so long as said engines remain synchronized, means for cutting off the flow of fluid in each of said fluid conduits, and manually operable means in circuit with both said fluid receiving means to regulate the pressure therein manually during those periods when fluid flow in said fluid conduits has been cut off by operation of said cut-off means.

2. In combination with a pair of engines, at least one having speed regulating means associated therewith, a pair of fluid pumps rotatable with said engines, one at a speed corresponding to one engine, the other at a speed corresponding to the other engine, means responsive to a difference in the pressures developed by said pumps to change the setting of said speed regulating means, said last-named means comprising fluid conduits connecting the inlet of each pump with the outlet of the other, fluid receiving means in communication with one of said conduits, additional fluid receiving means in communication with the other of said conduits, a mechanical linkage connecting said fluid receiving means with said speed regulating means, said linkage being held against movement by the equal and opposing pressures of said fluid receiving means, so long as said engines remain synchronized, means for cutting off the flow of fluid in each of said fluid conduits, and manually operable means in circuit with both said fluid receiving means to regulate the pressure therein manually during those periods when fluid flow in said fluid conduits has been cut off by operation of said cut-off means, said manually operable means including a hand pump for transferring fluid from one of said fluid receiving means to the other and thereby causing movement of said mechanical linkage in a direction corresponding to the direction of fluid transfer.

3. In combination with a pair of engines, at least one having speed regulating means associated therewith, a pair of fluid pumps rotatable with said engines, one at a speed corresponding to one engine, the other at a speed corresponding to the other engine, means responsive to a difference in the pressures developed by said pumps to change the setting of said speed regulating means, said last-named means comprising fluid receiving means in communication with said pumps, a mechanical linkage connecting said fluid receiving means with said speed regulating means, means for cutting off the flow of fluid from said pumps to said fluid receiving means, and manually operable means in circuit with both said fluid receiving means to regulate the pressure therein manually during those periods when fluid flow has been cut off by operation of said cut-off means, said manually operable means including a hand pump for transferring fluid in said fluid receiving means and thereby causing movement of said mechanical linkage in a direction corresponding to the direction of fluid transfer, and said cut-off means including a valve for each of said conduits and a single operating means for both said valves.

4. In combination with a pair of engines, at least one having speed regulating means associated therewith, a pair of fluid pumps rotatable with said engines, one at a speed corresponding to one engine, the other at a speed corresponding to the other engine, means responsive to a difference in the pressures developed by said pumps to change the setting of said speed regulating means, said last-named means including fluid conduits connecting the inlet of each pump with the outlet of the other, and said fluid conduits having sections disposed in coaxial relationship, means including a single rotary valve for cutting off fluid flow in said coaxial conduit sections simultaneously, and manually operable means for changing the setting of said speed regulating means during the periods when fluid flow through said fluid conduits is interrupted by virtue of operation of said single rotary valve.

5. In combination with a pair of engines, at least one having speed regulating means associated therewith, a pair of fluid pumps rotatable with said engines, one at a speed corresponding to one engine, the other at a speed corresponding to the other engine, means responsive to a difference in the pressures developed by said pumps to change the setting of said speed regulating means, said last-named means including fluid conduits connecting the inlet of each pump with the outlet of the other, said fluid conduits having sections disposed in coaxial relationship, means including a single valve for cutting off fluid flow in said coaxial conduit sections simultaneously, manually operable means for changing the setting of said speed regulating means during the periods when fluid flow through said fluid conduits is interrupted by virtue of operation of said single valve, said manually operable means including fluid receiving means normally in communication with one of said conduits, and additional fluid receiving means normally in communication with the other of said conduits, both said fluid receiving means being operatively associated with said speed regulating means and both being cut off from said first-named fluid conduits by movement of said single valve to the flow interrupting position.

6. In combination with a pair of engines, at least one having speed regulating means associated therewith, a pair of fluid pumps rotatable with said engines, one at a speed corresponding to one engine, the other at a speed corresponding to the other engine, means responsive to a difference in the pressures developed by said pumps to change the setting of said speed regulating means, said last-named means including fluid conduits connecting the inlet of each pump with the outlet of the other, said fluid conduits having sections disposed in coaxial relationship, means including a single valve for cutting off fluid flow in said coaxial conduit sections simultaneously, manually operable means for changing the setting of said speed regulating means during the periods when fluid flow through said fluid conduits is interrupted by virtue of operation of said single valve, said manually operable means including fluid receiving means normally in communication with one of said conduits, additional fluid receiving means normally in communication with the other of said conduits, both said fluid receiving means being operatively associated with said speed regulating means and both being cut off from said first-named fluid conduits by movement of said single valve to the flow interrupting position, and manually operable pumping means for transferring fluid from one of said fluid receiving means to the other independently of the position of said single valve.

CHARLES I. MacNEIL.